July 1, 1924. 1,499,620
J. B. LADD
RETRACTABLE PIPE SUPPORT
Filed June 12, 1923 3 Sheets-Sheet 1
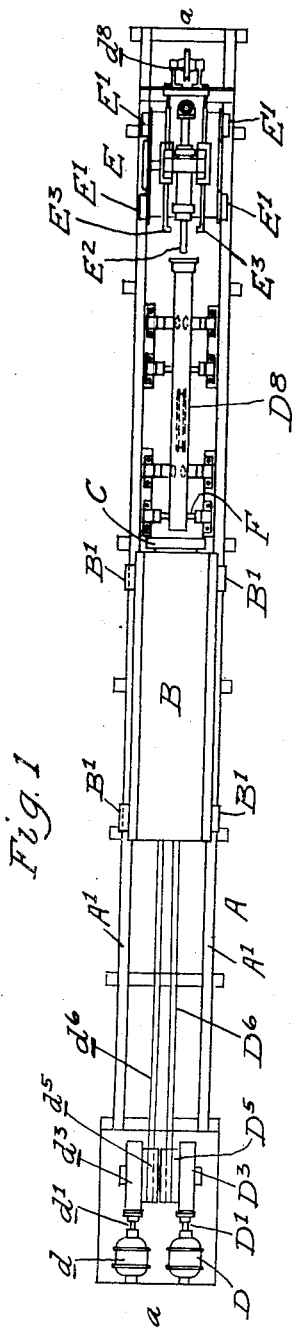
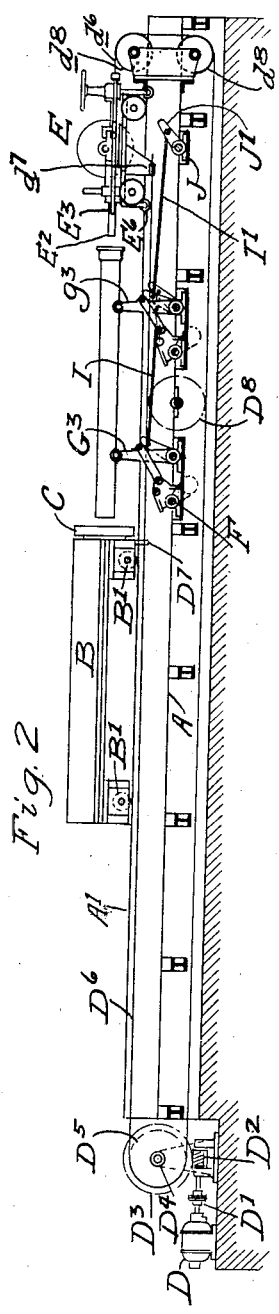
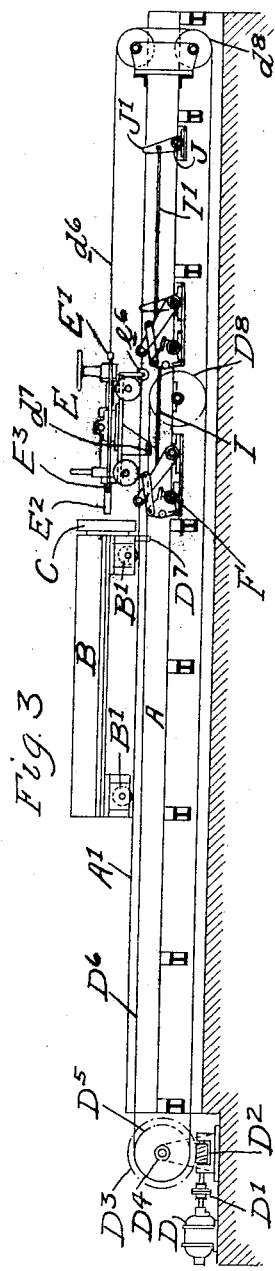
INVENTOR
James B. Ladd
BY
Francis J. Chambers
ATTORNEY

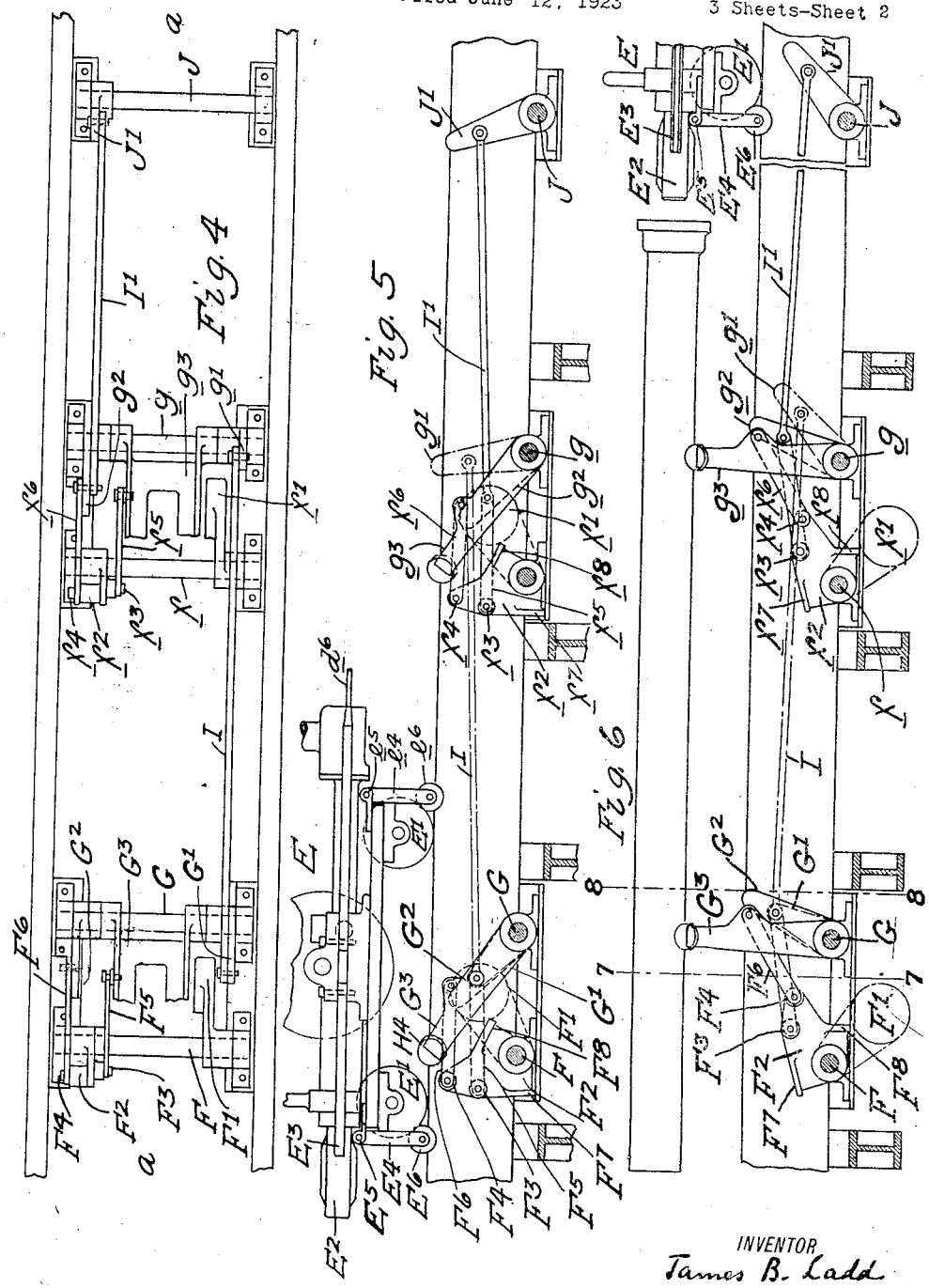

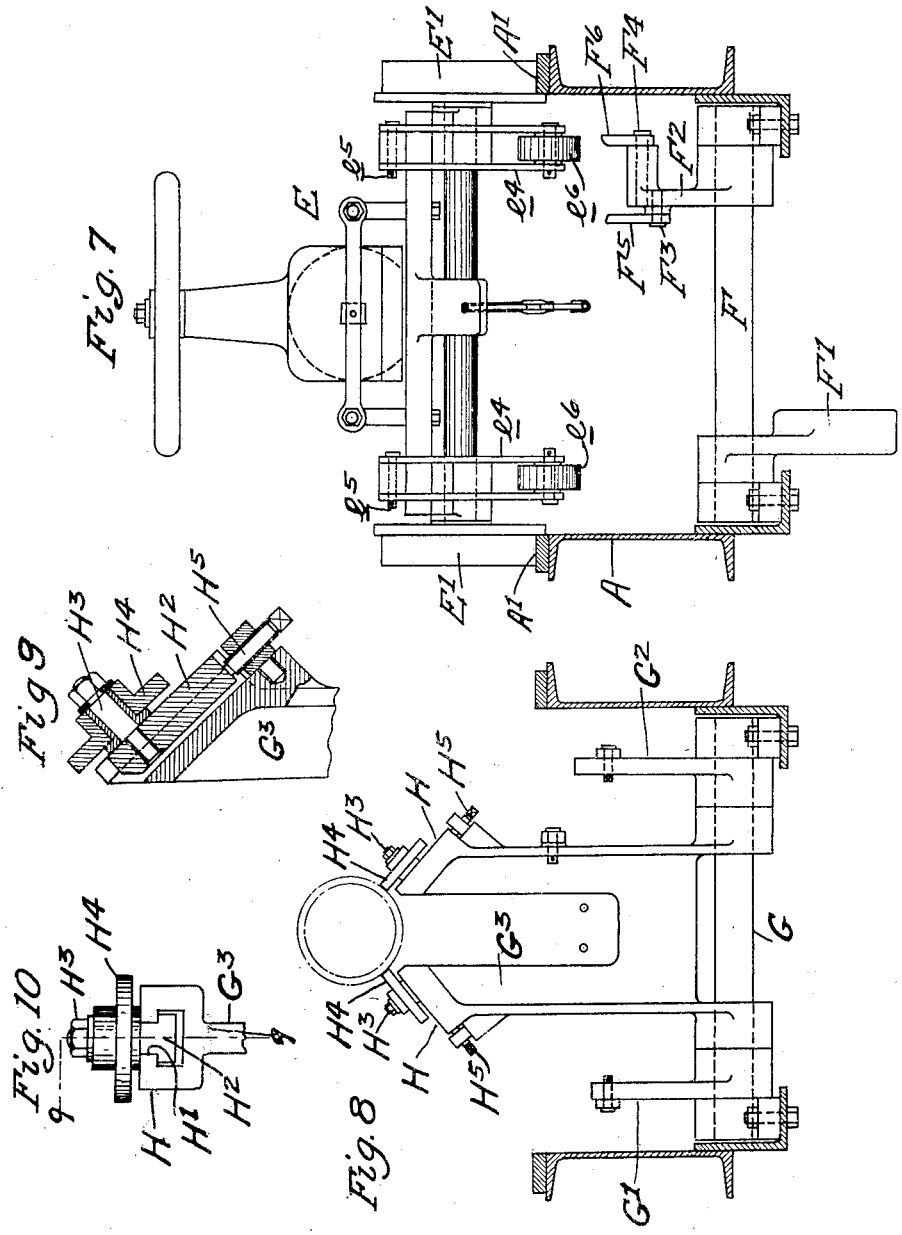

Patented July 1, 1924.

1,499,620

UNITED STATES PATENT OFFICE.

JAMES B. LADD, OF ARDMORE, PENNSYLVANIA, ASSIGNOR TO UNITED STATES CAST IRON PIPE & FOUNDRY COMPANY, OF BURLINGTON, NEW JERSEY, A CORPORATION OF NEW JERSEY.

RETRACTABLE PIPE SUPPORT.

Application filed June 12, 1923. Serial No. 644,954.

*To all whom it may concern:*

Be it known that I, JAMES B. LADD, a citizen of the United States of America, and resident of Ardmore, in the county of Montgomery, in the State of Pennsylvania, have invented certain new and useful Improvements in Retractable Pipe Supports, of which the following is a true and exact description, reference being had to the accompanying drawings, which form a part thereof.

My invention relates, generally speaking, to mechanism used for extracting cast pipes from the molds and is particularly designed for use in connection with metallic centrifugal molds for casting pipes. Specifically, my invention relates to mechanism for supporting pipes as they are drawn from the mold and immediately afterward, the object of my invention being to provide pipe supporting means which will be retracted from operating position as the pipe gripping mechanism approaches the mold and will be brought to operative position as the pipe gripping mechanism is retracted, drawing the pipe from the mold so as to afford a support for the pipe during and after the drawing operation.

The nature of my improvements will be best understood as described in connection with the drawings in which they are illustrated and in which—

Figure 1 is a plan view of a plant comprising centrifugal casting mechanism, pipe drawing mechanism and my improved pipe supporting mechanism, details being omitted on account of the small size of the drawing which are fully supplied in other figures.

Figure 2 is a side elevation of the mechanism shown in Fig. 1, with the pipe drawing mechanism shown in retracted position.

Figure 3 is a similar side elevation with the pipe drawing mechanism shown approaching the mold and the pipe supporting devices retracted.

Figure 4 is a plan view on an enlarged scale of the pipe supporting mechanism and the immediately connected operative devices.

Figure 5 is a side elevation of the devices shown in Fig. 4 with the carriage supporting the pipe gripping mechanism shown in addition.

Figure 6 is a view similar to Fig. 5, with the pipe supporting device shown in operative position with a pipe supported thereon and the carriage shown in retracted position.

Figure 7 is a cross sectional view taken as on the line 7—7 of Fig. 6, but showing also a rear view of the carriage.

Figure 8 is a cross sectional view on the line 8—8 of Fig. 6.

Figure 9 is a detail view as on the line 9—9 of Fig. 10, and

Figure 10 is a detail view showing the manner in which the pipe supporting rollers are adjustably secured to the body of the retractable pipe support.

A indicates the framing of the machine and A' tracks on which move the mold supporting casing and the carriage carrying the gripping mechanism. B is the mold supporting casing having supporting wheels indicated at B' which run on the tracks A'. C indicates the end of the mold projecting from the casing B. D indicates a motor having a shaft D' provided with a worm $D^2$ which engages with the worm wheel $D^3$ on the shaft $D^4$, which shaft also supports the pulley indicated at $D^5$, around which and the pulley indicated at $D^8$, extends the wire rope or chain indicated at $D^6$ which is secured to the casing B through a lug indicated at $D^7$ so that the said casing can be advanced and retracted on the track A'. $d$ indicates another motor having a shaft $d'$, a worm wheel similar to the worm wheel $D^2$ which engages a gear wheel $d^3$ on a shaft which also carries the pulley $d^5$ around which pulley extends the wire rope or chain $d^6$, one end of which extends around the pulleys indicated at $d^8$ and is connected to the carriage E, as indicated in Figs. 2 and 3, while the other end is connected to a bracket $d^7$ secured to the carriage E.

E indicates a carriage having wheels E' which run on the track A', said carriage supporting a longitudinally adjustable gripping head indicated at $E^2$ and laterally moving grippers indicated at $E^3$. The particular gripping mechanism supported by the carriage forms no part of my present invention and is, therefore, not shown in detail. To the front of the carriage are secured the pivot bars indicated at $E^4$, $E^4$, pivoted at $E^5$ and carrying at their ends rollers indicated at $E^6$. To the rear end of the carriage are secured similar pivot bars $e^4$, pivoted at $e^5$ and carrying rollers $e^6$.

F is a shaft pivoted in the frame of the machine to which is attached a counterweighted lever indicated at $F'$ and a lever $F^2$ carrying pivot pins $F^3$ and $F^4$ located as illustrated in Figs. 5 and 6, to which are pivotally connected the links indicated at $F^5$ and $F^6$. $F^7$ and $F^8$ indicate stop latches formed on the lever $F^2$ by which its movement is limited. G is a shaft pivoted in the frame and to which are secured levers indicated at $G'$ and $G^2$ and also a pipe supporting standard indicated at G. The links $F^5$ and $F^6$ are connected, as shown, to the standard $G^3$ and the lever $G^2$ so that when the parts are in the position shown in Fig. 6 they form a toggle, tending to hold the standard $G^3$ in its upright or operative position, while, at the same time, they are capable of assuming the position shown in Fig. 5, when the standard is retracted or turned down, as shown in that figure. The lever $G^2$ is of such length that, when the parts are in the position shown in Fig. 6, it lies in front of one of the rollers $E^6$ on one of the pivot bars $E^4$.

Some distance in the rear of the described parts I place the shaft $f$ having attached to it a counterweighted lever $f'$ and a lever $f^2$ and I provide links connected with said lever exactly as described with reference to the shaft F. I also provide another shaft, indicated at $g$, to which shaft is attached the pipe support indicated at $g^3$ and a lever $g^2$ similar in construction and attachment to the support $G^3$ and lever $G^2$, and I attach pivotally to this shaft $g$ a lever arm $g'$ which is connected with lever arm $G'$ on the shaft G by a rod indicated at I.

At a point still further to the rear I place a shaft J having attached to it a lever arm $J'$ which is connected to the lever arm $g^2$ by a rod $I'$.

To the tops of the supports $G^3$ and $g^3$ I secure pipe supporting rollers indicated at $H^4$, $H^4$. These are pivoted on pins $H^3$ projecting from slides $H^2$ moving in guideways $H'$ and adjustable by means of screws, as indicated at $H^5$.

In Figs. 1 and 2, I have shown the carriage carrying the pipe gripping mechanism in retracted position and the pipes supported on the supports $G^3$, $g^3$. This pipe is removed and the mold and mold casing carrying a freshly cast pipe is brought to the position indicated in Figs. 1, 2 and 3. The carriage E is then moved toward the left or toward the mold and one of the rollers $E^6$ comes in contact with the upper end of the lever $g^2$ which lies in its path, as indicated in Figure 6, with the result that this lever and the support $g^3$ is moved from the position shown in Fig. 6 to that shown in Fig. 5, while, at the same time, the counterweighted lever $f'$ and the lever $f^2$ is shifted to the position shown in Fig. 5, and I so apportion the weight of the support $g^3$ with reference to the weight and leverage of the counterweight lever $f'$ that when the parts occupy the position shown in Fig. 5 the force of gravity will hold them in that position. The construction illustrated enables the carriage E to move over the support $G^3$ without contacting with it and its forward movement toward the left brings it in contact with the upper end of the lever $G^2$ with the effect that this lever, the support $G^3$ and the counterweight mechanism connected thereto is shifted from the position shown in Fig. 6, to that shown in Fig. 5, enabling the carriage to move over this part of the mechanism without contacting with it and approach the end of the mold. The pipe gripping mechanism is then made to engage the pipe and the car E is moved toward the right, drawing the pipe from the mold and as one of the rollers $e^6$ comes in contact with the upper end of the lever $g'$ occupying the position shown in Fig. 5, this lever is moved toward the right to the position shown in Fig. 6 and, through the rod I and the lever $G'$, the support $G^3$ is drawn to operative position, as shown in Fig. 6, so that the pipe being drawn out of the mold will rest upon the rollers $H^4$ which afford a support for it and protect the mold to a great extent from the friction of the pipe being drawn from it. When the roller $e^6$ comes in contact with the upper end of the lever $J'$ it moves this lever to the position shown in Fig. 6, and through rod $I'$ draws the support $g^3$ to its operative position, as shown in Fig. 6, so that when the pipe is entirely removed from the mold it is supported on the two supports $G^3$ and $g^3$, as shown in Fig. 6 and can be released by the gripping mechanism and withdrawn in any convenient way.

Having now described my invention, what I claim as new and desire to secure by Letters Patent, is:

1. In combination with a pipe mold and means movable towards and from the mold for drawing a pipe therefrom, retractable means for supporting the pipe as it is drawn from the mold and means operating in synchronism with the movements of the pipe drawing means whereby the supporting means are retracted as said pipe drawing means move toward the mold and moved to operative position during the operative stroke of said means.

2. In combination with a pipe mold and a relatively reciprocating carriage supporting pipe drawing mechanism, two retractable pipe supports, means actuated by the movement of the carriage towards the mold for retracting said supports and means actuated by the outward movement of the carriage whereby the pipe supports are successively moved to operative position.

3. Mechanism for supporting cast pipes as they are drawn from a mold comprising a guideway for a carriage, a carriage supporting pipe, gripping mechanism movable to and fro on said guideway, pipe supporting means pivotally supported below the guideway so that they can be turned to operative position or to inoperative position out of the path of the carriage, means connected to said pivoted supports for retaining them in either operative or inoperative position and means actuated by the moving carriage whereby the pipe supporting means are successively brought to operative position as the carriage draws a pipe over them and retracted in advance of the carriage as it moves towards the mold.

JAMES B. LADD.